US011799705B2

United States Patent
Liu

(10) Patent No.: US 11,799,705 B2
(45) Date of Patent: Oct. 24, 2023

(54) MESSAGE TRANSMISSION METHOD AND DEVICE

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 532 days.

(21) Appl. No.: 17/262,588

(22) PCT Filed: Jul. 25, 2018

(86) PCT No.: PCT/CN2018/097081
§ 371 (c)(1),
(2) Date: Jan. 22, 2021

(87) PCT Pub. No.: WO2020/019208
PCT Pub. Date: Jan. 30, 2020

(65) Prior Publication Data
US 2021/0351968 A1 Nov. 11, 2021

(51) Int. Cl.
*H04W 4/00* (2018.01)
*H04L 27/26* (2006.01)
(Continued)

(52) U.S. Cl.
CPC ..... *H04L 27/26025* (2021.01); *H04W 56/001* (2013.01); *H04W 72/0446* (2013.01); *H04W 72/0453* (2013.01)

(58) Field of Classification Search
CPC .......... H04L 27/26025; H04W 56/001; H04W 72/0446; H04W 72/0453
(Continued)

(56) References Cited

U.S. PATENT DOCUMENTS

2018/0084593 A1* 3/2018 Chen ................... H04W 74/002
2018/0124744 A1* 5/2018 Xue ...................... H04W 72/23
(Continued)

FOREIGN PATENT DOCUMENTS

| CN | 107124383 A | 9/2017 |
|---|---|---|
| CN | 108012329 A | 5/2018 |
| WO | WO 2017167010 A1 | 10/2017 |

OTHER PUBLICATIONS

Extended European Search Report in European Application No. 18927425.1, dated Feb. 2, 2022.
(Continued)

*Primary Examiner* — Mark G. Pannell
(74) *Attorney, Agent, or Firm* — Finnegan, Henderson, Farabow, Garrett & Dunner, L.L.P.

(57) ABSTRACT

The present invention relates to a message transmission method and device. The method includes: determining, on a preset frequency band according to a first subcarrier spacing (SCS) corresponding to the frequency band, a first time-frequency resource corresponding to a synchronization signal/PBCH block, the frequency band including a low frequency band, the first SCS which corresponds to the low frequency band including 15 KHz, 30 KHz or 60 KHz, the synchronization signal/PBCH block including an indication bit of a second SCS corresponding to a message on the low frequency band, and the indication bit being 1 bit; and sending the synchronization signal/PBCH block on the determined first time-frequency resource.

16 Claims, 11 Drawing Sheets

(51) Int. Cl.
*H04W 56/00* (2009.01)
*H04W 72/0446* (2023.01)
*H04W 72/0453* (2023.01)

(58) Field of Classification Search
USPC .......................................................... 370/329
See application file for complete search history.

(56) References Cited

U.S. PATENT DOCUMENTS

| | | | |
|---|---|---|---|
| 2019/0140880 A1* | 5/2019 | Li | H04J 11/0086 |
| 2019/0150068 A1* | 5/2019 | Montojo | H04L 5/0046 |
| | | | 370/329 |
| 2019/0306832 A1* | 10/2019 | Si | H04W 72/0446 |
| 2019/0387547 A1* | 12/2019 | Shin | H04W 74/0866 |
| 2019/0387550 A1* | 12/2019 | Pan | H04W 74/0833 |
| 2020/0053786 A1* | 2/2020 | Kim | H04B 7/0695 |
| 2020/0068512 A1* | 2/2020 | Xue | H04L 5/0091 |
| 2020/0154376 A1* | 5/2020 | Ko | H04W 72/30 |
| 2020/0221403 A1* | 7/2020 | Gao | H04W 56/001 |
| 2020/0267697 A1* | 8/2020 | Liu | H04W 56/001 |
| 2020/0280418 A1* | 9/2020 | Gao | H04W 72/23 |
| 2020/0280957 A1* | 9/2020 | Gao | H04L 5/0094 |
| 2020/0337002 A1* | 10/2020 | Ko | H04L 5/0016 |
| 2020/0413453 A1* | 12/2020 | Shao | H04W 74/00 |
| 2021/0084687 A1* | 3/2021 | Liu | H04W 74/0833 |

OTHER PUBLICATIONS

Examination Report of Indian Application No. 202147006704, dated Jan. 14, 2022.

LG Electronics: "RMSI delivery and CORESET configuration", 3GPP TSG RAN WG1 Meeting #90, R1-1713125, Prague, Czech Republic, Aug. 21-25, 2017, 8 pages.

* cited by examiner

MESSAGE TRANSMISSION METHOD AND DEVICE

CROSS REFERENCE TO RELATED APPLICATIONS

This application is a national phase application based on International Application No. PCT/CN2018/097081, filed Jul. 25, 2018, the content of which is incorporated herein by reference.

TECHNICAL FIELD

The present disclosure relates to a field of communication technologies, and particularly to a message transmission method and a message transmission device.

BACKGROUND

In the related art, a project study on 5G ($5^{th}$ generation mobile networks) unlicensed spectrum has recently been conducted in the industry, and a solution to support independent networking of 5G unlicensed cells is proposed. In the independent networking design of 5G unlicensed spectrum, the design of a synchronization signal/physical broadcast channel block (SS/PBCH block, SSB for short in the following) is considered firstly. However, there is no effective solution in the industry at present.

SUMMARY

Embodiments of the present disclosure provide a message transmission method and a message transmission device. The technical solutions may be as follows.

According to a first aspect of embodiments of the present disclosure, a message transmission method is provided. The method includes: determining, at a preset frequency band, a first time-frequency resource corresponding to a synchronization signal/physical broadcast channel block (SSB) according to a first subcarrier spacing (SCS) corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit; and sending the SSB on the determined first time-frequency resource.

The technical solution according to the embodiments of the present disclosure may have the following beneficial effects. In this embodiment, the value of 60 KHz is added for the SCS at the low-frequency band. With this value, the length of the SSB may be reduced, which is conductive to improving a success rate of sending the SSB under the LBT (listen before talk) mechanism. In addition, the indication bit is 1 bit, which does not occupy additional network resources.

In an embodiment, the method further includes: determining a second time-frequency resource corresponding to the message according to the second SCS; and sending the message on the determined second time-frequency resource.

The technical solution according to the embodiments of the present disclosure may have the following beneficial effects. In this embodiment, sending the message based on the second SCS is implemented. The second SCS is adaptive to the first SCS.

In an embodiment, when the first SCS includes 30 KHz or 60 KHz, the second SCS includes at least one of 15 KHz, 30 KHz, and 60 KHz.

The technical solution according to the embodiments of the present disclosure may have the following beneficial effects. In this embodiment, the second SCS may have multiple options, which are suitable for multiple application scenarios.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz. When the first SCS includes 60 KHz, and when time division multiplexing is performed on the first time-frequency resource and the second time-frequency resource, the second SCS includes at least one of 30 KHz and 60 KHz. When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

The technical solution according to the embodiments of the present disclosure may have the following beneficial effects. This embodiment provides corresponding SCS values for the time division multiplexing or the frequency division multiplexing of the SSB and messages, providing feasible solutions for various application scenarios.

In an embodiment, when the first SCS includes 30 KHz and the time division multiplexing is performed on the first time-frequency resource and the second time-frequency resource, the method further includes: sending a master information block (MIB) to user equipment, in which A6 or A7 bit of the MIB is configured to indicate that the second SCS includes at least one of 15 KHz and 30 KHz, or at least one of 30 KHz and 60 KHz.

The technical solution according to the embodiments of the present disclosure may have the following beneficial effects. In this embodiment, the A6 or A7 bit in the MIB is used to indicate a value range of the second SCS.

In an embodiment, the message includes at least one of a system information block, a random response message 2 and a random response message 4.

The technical solution according to the embodiments of the present disclosure may have the following beneficial effects. The system information block, the random response message 2 and the random response message 4 are all applicable to the embodiment.

In an embodiment, a first SCS corresponding to a high sub-band in the low frequency band includes 30 KHz or 60 KHz, and a first SCS corresponding to a low sub-band in the low frequency band includes 15 KHz or 30 KHz.

The technical solution according to the embodiments of the present disclosure may have the following beneficial effects. In this embodiment, the low frequency band is further divided and possible values are provided for the first SCS.

According to a second aspect of embodiments of the present disclosure, a message transmission method is provided. The method is applied to a user equipment side. The method includes: monitoring, at a preset frequency band, a first time-frequency resource corresponding to an SSB according to a first SCS corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit; and receiving the SSB on the first time-frequency resource.

In an embodiment, the method further includes: determining a second time-frequency resource corresponding to the message according to the second SCS; and receiving the message on the determined second time-frequency resource.

In an embodiment, when the first SCS includes 30 KHz or 60 KHz, and the second SCS includes at least one of 15 KHz, 30 KHz, and 60 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz. When the first SCS includes 60 KHz, and when time division multiplexing is performed on the first time-frequency resource and the second time-frequency resource, the second SCS includes at least one of 30 KHz and 60 KHz. When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

In an embodiment, when the first SCS includes 30 KHz and the time division multiplexing is performed on the first time-frequency resource and the second time-frequency resource, the method further includes: receiving a MIB from a base station, in which A6 or A7 bit of the MIB is configured to indicate that the second SCS includes at least one of 15 KHz and 30 KHz, or at least one of 30 KHz and 60 KHz.

In an embodiment, the message includes at least one of a system information block, a random response message 2 and a random response message 4.

In an embodiment, a first SCS corresponding to a high sub-band in the low frequency band includes 30 KHz or 60 KHz, and a first SCS corresponding to a low sub-band in the low frequency band includes 15 KHz or 30 KHz.

According to a third aspect of embodiments of the present disclosure, a message transmission device is provided. The device is applied to a base station side. The device includes: a first determining module and a first sending module. The first determining module is configured to determine, at a preset frequency band, a first time-frequency resource corresponding to a synchronization signal/physical broadcast channel (SS/PBCH) block according to a first subcarrier spacing (SCS) corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit. The first sending module is configured to send the SSB on the determined first time-frequency resource.

In an embodiment, the device further includes: a second determining module and a second sending module. The second determining module is configured to determine a second time-frequency resource corresponding to the message according to the second SCS. The second sending module is configured to send the message on the determined second time-frequency resource.

In an embodiment, when the first SCS includes 30 KHz or 60 KHz, and the second SCS includes at least one of 15 KHz, 30 KHz, and 60 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz. When the first SCS includes 60 KHz, and when time division multiplexing is performed on the first time-frequency resource and the second time-frequency resource, the second SCS includes at least one of 30 KHz and 60 KHz. When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

In an embodiment, when the first SCS includes 30 KHz and when the time division multiplexing is performed on the first time-frequency resource and the second time-frequency resource, the device further includes a third sending module, configured to send a master information block (MIB) to user equipment, in which A6 or A7 bit of the MIB is configured to indicate that the second SCS includes at least one of 15 KHz and 30 KHz, or at least one of 30 KHz and 60 KHz.

In an embodiment, the message includes at least one of a system information block, a random response message 2 and a random response message 4.

In an embodiment, a first SCS corresponding to a high sub-band in the low frequency band includes 30 KHz or 60 KHz, and a first SCS corresponding to a low sub-band in the low frequency band includes 15 KHz or 30 KHz.

According to a fourth aspect of embodiments of the present disclosure, a message transmission device is provided. The device is applied to a user equipment side. The device includes: a monitoring module and a first receiving module. The monitoring module is configured to monitor, at a preset frequency band, a first time-frequency resource corresponding to an SSB according to a first SCS corresponding to the frequency band, the frequency band including a low frequency band, a first SCS corresponding to the low frequency band including 15 KHz, 30 KHz or 60 KHz, the SSB including an indication bit of a second SCS corresponding to a message on the low frequency band, and the indication bit being 1 bit. The first receiving module is configured to receive the SSB on the first time-frequency resource.

In an embodiment, the device further includes: a determining module and a second receiving module. The determining module is configured to determine a second time-frequency resource corresponding to the message according to the second SCS. The second receiving module is configured to receive the message on the determined second time-frequency resource.

In an embodiment, when the first SCS includes 30 KHz or 60 KHz, and the second SCS includes at least one of 15 KHz, 30 KHz, and 60 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz. When the first SCS includes 60 KHz, and when time division multiplexing is performed on the first time-frequency resource and the second time-frequency resource, the second SCS includes at least one of 30 KHz and 60 KHz. When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

In an embodiment, when the first SCS includes 30 KHz and the time division multiplexing is performed on the first time-frequency resource and the second time-frequency resource, the device further includes: a third receiving module, configured to receive a MIB from a base station, in which A6 or A7 bit of the MIB is configured to indicate that the second SCS includes at least one of 15 KHz and 30 KHz, or at least one of: 30 KHz and 60 KHz.

In an embodiment, the message includes at least one of a system information block, a random response message 2 and a random response message 4.

In an embodiment, a first SCS corresponding to a high sub-band in the low frequency band includes 30 KHz or 60 KHz, and a first SCS corresponding to a low sub-band in the low frequency band includes 15 KHz or 30 KHz.

According to a fifth aspect of embodiments of the present disclosure, a message transmission device is provided. The device includes: a processor, and a memory configured to store instructions executable by the processor. The processor is configured to: determine, at a preset frequency band, a first time-frequency resource corresponding to a synchronization signal/physical broadcast channel (SS/PBCH) block according to a first subcarrier spacing (SCS) corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit; and send the SSB on the determined first time-frequency resource.

According to a sixth aspect of embodiments of the present disclosure, a message transmission device is provided. The device includes: a processor, and a memory configured to store instructions executable by the processor. The processor is configured to: determine, at a preset frequency band, a first time-frequency resource corresponding to a synchronization signal/physical broadcast channel (SS/PBCH) block according to a first subcarrier spacing (SCS) corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit; and send the SSB on the determined first time-frequency resource.

According to a seventh aspect of embodiments of the present disclosure, a computer-readable storage medium having computer instructions stored thereon is provided. When the instructions are executed by a processor, the processor is caused to implement the method applied to a base station side.

According to an eighth aspect of embodiments of the present disclosure, a computer-readable storage medium having computer instructions stored thereon is provided. When the instructions are executed by a processor, the processor is caused to implement the method applied to a user equipment side.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In the related art, the minimum bandwidth of user equipment (UE) on 5G unlicensed spectrum is different from that in cellular communication. Generally, the minimum bandwidth of UE in the 5G unlicensed spectrum is relatively large. For example, the minimum bandwidth is generally above 20 MHz. If it is applied at a low-frequency band, the minimum bandwidth is likely to be exceeded when transmitting messages such as a synchronization signal/physical broadcast channel block (SS/PBCH block, SSB for short) and a system information block (SIB), which makes it inconvenient to configure time-frequency resources during transmission.

In order to solve the above-mentioned problem, in this embodiment, a value of 60 KHz is added for a subcarrier spacing (SCS) of the SSB to reduce a time domain length of the SSB, which helps to improve the success rate of sending the SSB in the LBT (listen before talk) mechanism. In addition, an indication bit of a second SCS corresponding to a message in the low-frequency band in the SSB is 1 bit, which does not occupy additional network resources and is compatible with the SSB transmission solution of the 5G system.

Figure 1:
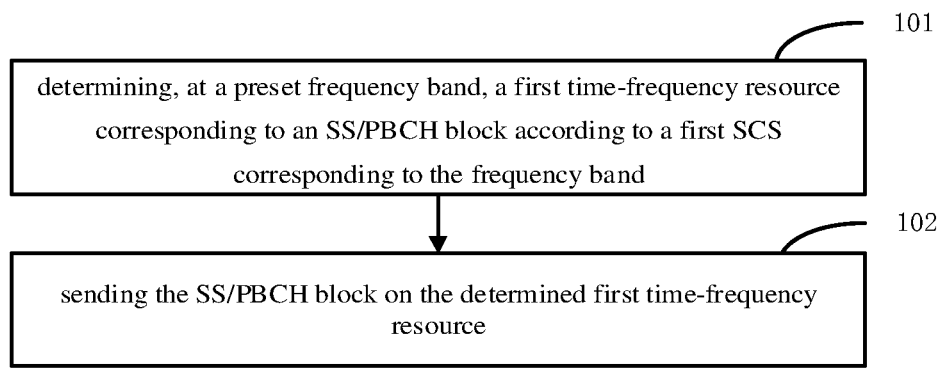
FIG. 1 is a flowchart of a message transmission method according to an exemplary embodiment of the present disclosure.

FIG. 1 is a flowchart of a message transmission method according to an exemplary embodiment of the present disclosure. This message transmission method is applied to access network equipment such as a base station. As illustrated in FIG. 1, the method includes the followings at steps 101-102.

At step 101, at a preset frequency band, a first time-frequency resource corresponding to an SSB is determined according to a first SCS corresponding to the frequency band, the frequency band includes a low frequency band, a first SCS corresponding to the low frequency band includes 15 KHz, 30 KHz or 60 KHz, the SSB includes an indication bit of a second SCS corresponding to a message at the low frequency band, and the indication bit is 1 bit.

At step 102, the SSB is sent on the determined first time-frequency resource.

In this embodiment, in the 5G unlicensed spectrum, a value of 60 KHz is added for the SCS of the SSB, so that the value of the first SCS may be 15 KHz, 30 KHz, or 60 KHz. The value of the first SCS configured for the base station may be all or part of 15 KHz, 30 KHz, and 60 KHz. The base station determines one of the values of the first SCS when the SSB needs to be sent, and determines the first time-frequency resource corresponding to the SSB based on the determined value. The first time-frequency resource refers to a time-frequency resource corresponding to the SSB, and may include time-frequency resources of a plurality of carriers.

The low frequency band refers to a frequency band less than 7 GHz. For the high frequency band (a frequency band greater than 7 GHz), the value of the first SCS may include 120 KHz and 240 KHz.

The SSB transmitted at the low frequency band includes the indication bit of the second SCS corresponding to the message at the low frequency band, and the indication bit occupies 1 bit to save network resources as much as possible.

After the first time-frequency resource is determined, the SSB may be sent on the first time-frequency resource. Certainly, it may be detected whether the first time-frequency resource is free before sending the SSB, and when the first time-frequency resource is free, the SSB is sent, so that the LBT mechanism is met.

When the SCS is 60 KHz, a time domain length of the SSB may be relatively small. For example, the time domain length of the SSB when the SCS is 60 KHz may be a quarter of a time domain length of the SSB when the SCS is 15 KHz, and the SSB may occupy 2 time domain symbols or even less, which is beneficial to improve the success rate of detection, thus improving the success rate of sending the SSB in the LBT mechanism, so that it is convenient for the user equipment to complete synchronization process in time.

In an embodiment, the method further includes actions at steps A1-A2.

At step A1, a second time-frequency resource corresponding to the message is determined according to the second SCS.

At step A2, the message is sent on the determined second time-frequency resource.

In this embodiment, a value range of the second SCS is determined according to the value of the first SCS. The SSB includes the indication bit of the second SCS corresponding to the message at the low frequency band. Based on a value of the indication bit, a value of the second SCS within the determined value range is determined. The second time-frequency resource corresponding to the message may be further determined based on the value of the second SCS, and the message is sent. The second time-frequency resource refers to a time-frequency resource corresponding to the message, and may include time-frequency resources of multiple carriers.

The user equipment may monitor the first time-frequency resource at full frequency band to receive the SSB. The first SCS is determined according to a frequency band where the received SSB is located, and then the value range of the second SCS is determined. The user equipment parses the SSB, and obtains the value of the indication bit. Then, the value of the second SCS is determined. The second time-frequency resource is determined according to the value of the second SCS. The second time-frequency resource is monitored to receive the message.

In an embodiment, when the first SCS includes 30 KHz or 60 KHz, the second SCS includes at least one of 15 KHz, 30 KHz, and 60 KHz.

In this embodiment, the value of 60 KHz is added for the value of the second SCS. When the first SCS takes different values, the second SCS has a corresponding value range. Moreover, a value of a third SCS corresponding to the data may include 15 KHz, 30 KHz, and 60 KHz, which are applicable to all the values of the first SCS. A corresponding relation between the values of the first SCS, the second SCS, and the third SCS is shown in Table 1.

TABLE 1

| first SCS (KHz) | second SCS (KHz) | third SCS (KHz) |
| --- | --- | --- |
| 15 | 15, 30 | 15, 30, 60 |
| 30 | 15, 30, 60 | 15, 30, 60 |
| 60 | 15, 30, 60 | 15, 30, 60 |

For the high frequency band, the value of the first SCS may include 120 KHz or 240 KHz, both of which may correspond to the values 60 and 120 of the second SCS and the values 60 and 120 of the third SCS.

Both the second SCS and the third SCS may have multiple values. The values configured for the base station may be all or part of 15 KHz, 30 KHz, and 60 KHz. The base station determines one of the values when the base station needs to send the SSB.

The indication bit in the SSB occupies 1 bit. For example, the value range of the second SCS is 15 KHz and 30 KHz. When the value of the indication bit is 0, it means that the value of the second SCS is 15 KHz. When the value of the indication bit is 1, it means that the value of the second SCS is 30 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz.

In this embodiment, since the frequency division multiplexing is adopted, the value of the second SCS may be relatively small. In order to satisfy the condition that the indication bit is 1 bit, the values of the second SCS are two relatively small values, i.e., 15 KHz and 30 KHz.

In an embodiment, when the first SCS includes 60 KHz, and when time division multiplexing is performed on the first time-frequency resource and the second time-frequency resource, the second SCS includes at least one of 30 KHz and 60 KHz.

In this embodiment, since the time division multiplexing is adopted, the value of the second SCS may be relatively large. In order to satisfy the condition that the indication bit is 1 bit, the value of the second SCS may include two relatively large values, i.e., 30 KHz and 60 KHz. After the time division multiplexing is performed, time-frequency resources occupied by the SSB and the message generally do not exceed a bandwidth of 20 M, which still facilitates allocation of time-frequency resources and transmission of information blocks (including SSB, messages, and data).

In an embodiment, when the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

In this embodiment, since the time division multiplexing is adopted, the value of the second SCS may have multiple choices. In order to satisfy the condition that the indication bit is 1 bit, the value range of the second SCS may be 15 KHz and 30 KHz, or 30 KHz and 60 KHz. After the time division multiplexing is performed, time-frequency resources occupied by the SSB and the message generally do not exceed a bandwidth of 20 M, which still facilitates allocation of time-frequency resources and transmission of information blocks.

In an embodiment, when the first SCS includes 30 KHz, and when the time division multiplexing is performed on the first time-frequency resource and the second time-frequency resource, the method further includes step B.

At step B, a master information block (MIB) is sent to the user equipment, in which A6 or A7 bit of the MIB is configured to indicate that the second SCS includes at least one of 15 KHz and 30 KHz, or at least one of 30 KHz and 60 KHz.

In an embodiment, when the first SCS includes 30 KHz, and when the time division multiplexing is adopted, the second SCS may have two value ranges, i.e., a range containing 15 KHz and 30 KHz, and a range containing 30 KHz and 60 KHz. The base station may inform the user equipment which value range the second SCS adopts. Since the indication bit in the SSB is only 1 bit, this requirement may not be met. Therefore, in this embodiment, a reserved bit A6 or A7 in the MIB is used. In this case, for example, when a value of the A6 or A7 bit is 0, it means that the value range of the second SCS is 15 KHz and 30 KHz. When the value of A6 or A7 bit is 1, it means that the value range of the second SCS is 30 KHz and 60 KHz. When the first SCS is not 30 KHz or the time division multiplexing is not adopted, A6 and A7 bit may still be the reserved bits or used in other schemes.

The MIB may be carried by a physical broadcast channel (PBCH). The PBCH and the SSB may belong to the same information block. When the user equipment receives the SSB, the MIB may be received. Alternatively, the user equipment may also receive the PBCH in an idle state or an inactive state of a connection state, so the user equipment may receive the MIB in advance.

In an embodiment, the message includes at least one of a system information block (SIB), a random response message 2 (Msg2) and a random response message 4 (Msg4).

There may be multiple types of messages in this embodiment, and the second SCS of SIB, Msg2 and Msg4 are all applicable to the above embodiment.

In an embodiment, a first SCS corresponding to a high sub-band in the low frequency band includes 30 KHz or 60 KHz, and a first SCS corresponding to a low sub-band in the low frequency band includes 15 KHz or 30 KHz.

In an embodiment, the high sub-band may be 5 GHz-75 GHz. The low sub-band may be less than 5 GHz.

An implementation process at the base station side is described in detail below through embodiments.

Figure 2:
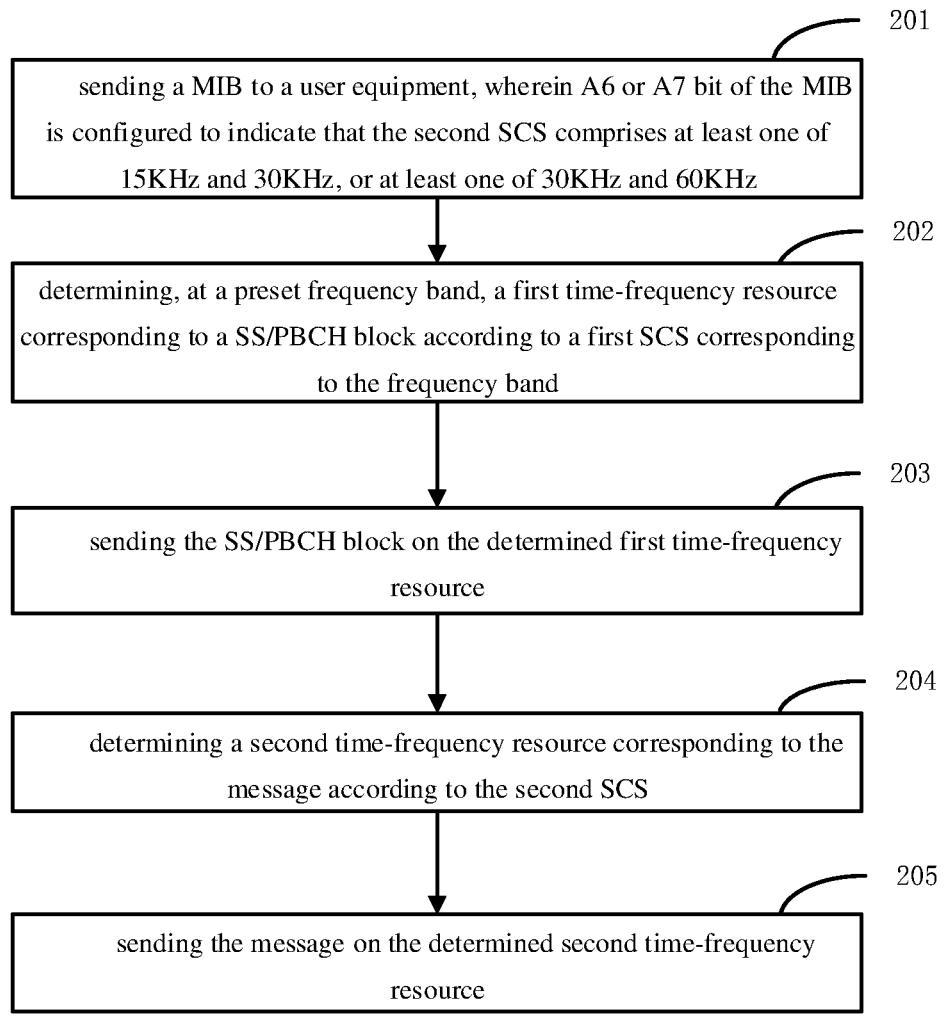
FIG. 2 is a flowchart of a message transmission method according to an exemplary embodiment of the present disclosure.

FIG. 2 is a flowchart of a message transmission method according to an exemplary embodiment of the present disclosure. This message transmission method is applied to access network equipment such as a base station. As illustrated in FIG. 2, the method includes the following actions at steps 201-205.

At step 201, a master information block (MIB) is sent to user equipment, in which A6 or A7 bit of the MIB is configured to indicate that the second SCS includes at least one of 15 KHz and 30 KHz, or at least one of 30 KHz and 60 KHz.

At step 202, at a preset frequency band, a first time-frequency resource corresponding to a synchronization signal/physical broadcast channel (SS/PBCH) block is determined according to a first subcarrier spacing (SCS) corresponding to the frequency band, the frequency band includes a low frequency band, a first SCS corresponding to the low frequency band includes 15 KHz, 30 KHz or 60 KHz, the SSB includes an indication bit of a second SCS corresponding to a message at the low frequency band, and the indication bit is 1 bit.

At step 203, the SSB is sent on the determined first time-frequency resource.

At step 204, a second time-frequency resource corresponding to the message is determined according to the second SCS.

At step 205, the message is sent on the determined second time-frequency resource.

The above describes the implementation process at the base station side, and correspondingly, there are improvements at the user equipment side. An implementation process at the user equipment side will be introduced below.

Figure 3:
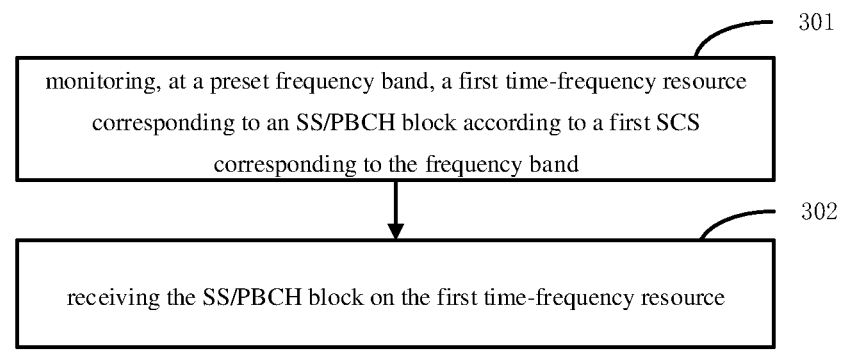
FIG. 3 is a flowchart of a message transmission method according to an exemplary embodiment of the present disclosure.

FIG. 3 is a flowchart of a message transmission method according to an exemplary embodiment of the present disclosure. The message transmission method is applied to user equipment. The user equipment may be a mobile phone, a computer, a digital broadcasting terminal, a message sending-and-receiving device, a game console, a tablet device, a medical device, a fitness device, a personal digital assistant, and the like. As illustrated in FIG. 3, the method includes the followings at steps 301-302.

At step 301, at a preset frequency band, a first time-frequency resource corresponding to an SSB is monitored according to a first SCS corresponding to the frequency band, the frequency band includes a low frequency band, a first SCS corresponding to the low frequency band includes 15 KHz, 30 KHz or 60 KHz, the SSB includes an indication bit of a second SCS corresponding to a message on the low frequency band, and the indication bit is 1 bit.

At step 302, the SSB is received on the first time-frequency resource.

The user equipment may traverse the entire frequency band, and monitor the first time-frequency resource corresponding to the SSB at each frequency band according to the first SCS corresponding to each frequency band. At the low frequency band, the user equipment may monitor the first time-frequency resource corresponding to the SSB according to the first SCS of 15 KHz, 30 KHz, or 60 KHz, and receive the SSB on the first time-frequency resource.

In this embodiment, in the 5G unlicensed spectrum, the value of 60 KHz is added for the SCS of the SSB, so that the value of the first SCS may include 15 KHz, 30 KHz, and 60 KHz. The user equipment monitors the first time-frequency resource according to a value pre-configured by the system. When the SCS is 60 KHz, a time domain length of the SSB may be relatively small. The success rate of sending the SSB in the LBT mechanism is improved, which is convenient for the user equipment to complete the synchronization process in time.

The SSB transmitted at the low frequency band includes the indication bit of the second SCS corresponding to the message at the low frequency band, and the indication bit occupies 1 bit to save network resources as much as possible.

The low frequency band refers to a frequency band below 7 GHz. For the high frequency band (a frequency band above 7 GHz), the value of the first SCS may include 120 KHz and 240 KHz.

In an embodiment, the method further includes actions at steps C1-C2.

At step C1, a second time-frequency resource corresponding to the message is determined according to the second SCS.

At step C2, the message is received on the determined second time-frequency resource.

The user equipment may determine the second SCS according to the indication bit in the SSB, and then determine the second time-frequency resource to receive the message.

In an embodiment, when the first SCS includes 30 KHz or 60 KHz, the second SCS includes at least one of 15 KHz, 30 KHz, and 60 KHz.

In this embodiment, the value of 60 KHz is added for the value of the second SCS. When the first SCS takes different values, the second SCS has a corresponding value range. Moreover, a value of a third SCS corresponding to the data may include 15 KHz, 30 KHz, and 60 KHz, which are applicable to all the values of the first SCS. A corresponding relation between the values of the first SCS, the second SCS, and the third SCS is shown in Table 1.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz.

In this embodiment, since the frequency division multiplexing is adopted, the value of the second SCS may be relatively small. In order to satisfy the condition that the indication bit is 1 bit, the values of the second SCS are two relatively small values, i.e., 15 KHz and 30 KHz.

In an embodiment, when the first SCS includes 60 KHz, and when time division multiplexing is performed on the first time-frequency resource and the second time-frequency resource, the second SCS includes at least one of 30 KHz and 60 KHz.

In this embodiment, since the time division multiplexing is adopted, the value of the second SCS may be relatively large. In order to satisfy the condition that the indication bit is 1 bit, the values of the second SCS are two relatively large values, i.e., 30 KHz and 60 KHz. After the time division multiplexing is performed, time-frequency resources occupied by the SSB and the message generally do not exceed a bandwidth of 20 M, which still facilitates allocation of time-frequency resources and transmission of information blocks (including SSB and messages, and data).

In an embodiment, when the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

In this embodiment, since the time division multiplexing is adopted, the value of the second SCS may have multiple choices. In order to satisfy the condition that the indication bit is 1 bit, the value range of the second SCS may be 15 KHz and 30 KHz, or 30 KHz and 60 KHz. After the time division multiplexing is performed, time-frequency resources occupied by the SSB the message generally do not exceed a bandwidth of 20 M, which still facilitates allocation of time-frequency resources and transmission of information blocks.

In an embodiment, when the first SCS includes 30 KHz, and when the time division multiplexing is performed on the first time-frequency resource and the second time-frequency resource, the method further includes an action at step D.

At step D, a MIB is received from the base station, in which A6 or A7 bit of the MIB is configured to indicate that the second SCS includes at least one of 15 KHz and 30 KHz, or at least one of 30 KHz and 60 KHz.

In an embodiment, when the first SCS includes 30 KHz, and when the time division multiplexing is adopted, the second SCS may have two value ranges, i.e., a range containing 15 KHz and 30 KHz, and a range containing 30 KHz and 60 KHz. The user equipment needs to acknowledge which value range the second SCS adopts. Since the indication bit in the SSB is only 1 bit, this requirement may not be met. Therefore, in this embodiment, a reserved bit A6 or A7 in the MIB is used. In this case, for example, when a value of the A6 or A7 bit is 0, it means that the value range of the second SCS is 15 KHz and 30 KHz. When the value of A6 or A7 bit is 1, it means that the value range of the second SCS is 30 KHz and 60 KHz. When the first SCS is not 30 KHz or the time division multiplexing is not adopted, A6 and A7 bit may still be the reserved bit or used in other schemes.

In an embodiment, the message includes at least one of a SIB, a random response message 2 (Msg2) and a random response message 4 (Msg4).

There may be multiple types of messages in this embodiment, and the second SCS of SIB, Msg2 and Msg4 are all applicable to the above embodiment.

In an embodiment, a first SCS corresponding to a high sub-band in the low frequency band includes 30 KHz or 60 KHz, and a first SCS corresponding to a low sub-band in the low frequency band includes 15 KHz or 30 KHz.

In an embodiment, the high sub-band may be 5 GHz-75 GHz. The low sub-band may be less than 5 GHz.

An implementation process at the user equipment side is described in detail below through embodiments.

Figure 4:
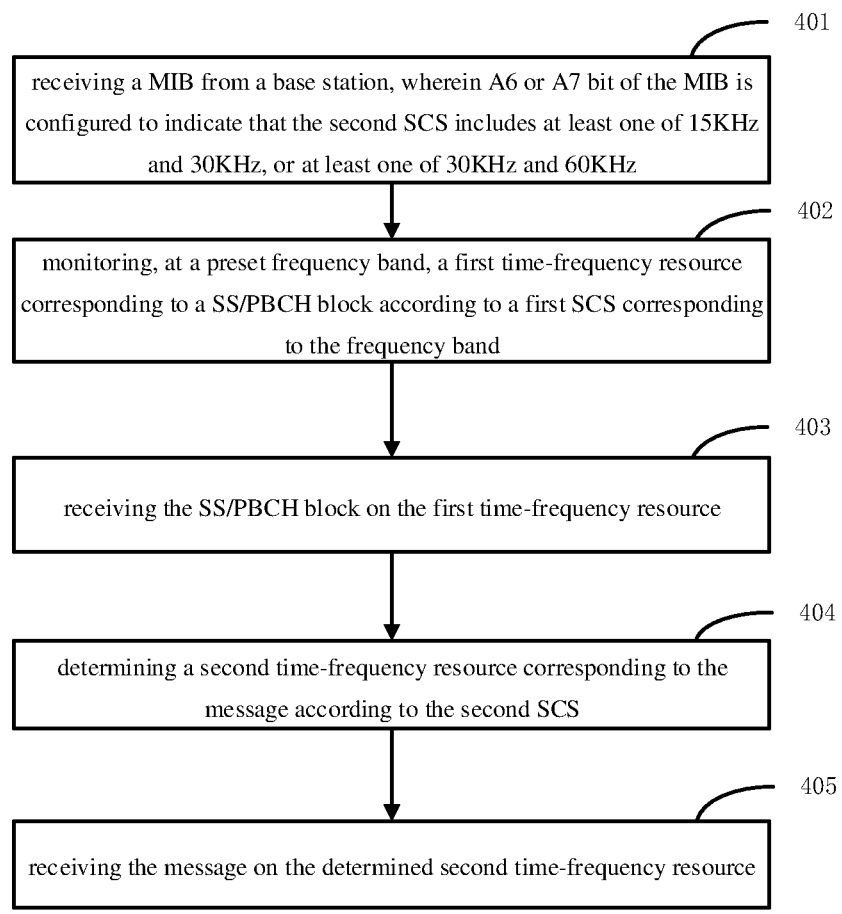
FIG. 4 is a flowchart of a message transmission method according to an exemplary embodiment of the present disclosure.

FIG. 4 is a flowchart of a message transmission method according to an exemplary embodiment of the present disclosure. The message transmission method is applied to user equipment. The user equipment may be a mobile phone, a computer, a digital broadcasting terminal, a message sending-and-receiving device, a game console, a tablet device, a medical device, a fitness device, a personal digital assistant, and the like. As illustrated in FIG. 4, the method includes the followings steps 401-405.

At step 401, a MIB is received from a base station, in which A6 or A7 bit of the MIB is configured to indicate that the second SCS includes at least one of 15 KHz and 30 KHz, or at least one of 30 KHz and 60 KHz.

At step 402, at a preset frequency band, a first time-frequency resource corresponding to an SSB is monitored according to a first SCS corresponding to the frequency band, the frequency band includes a low frequency band, a first SCS corresponding to the low frequency band includes 15 KHz, 30 KHz or 60 KHz, the SSB includes an indication bit of a second SCS corresponding to a message at the low frequency band, and the indication bit is 1 bit.

At step 403, the SSB is received on the first time-frequency resource.

At step 404, a second time-frequency resource corresponding to the message is determined according to the second SCS.

At step 405, the message is received on the determined second time-frequency resource.

The following describes the implementation process at both the base station side and the user equipment side.

Figure 5:
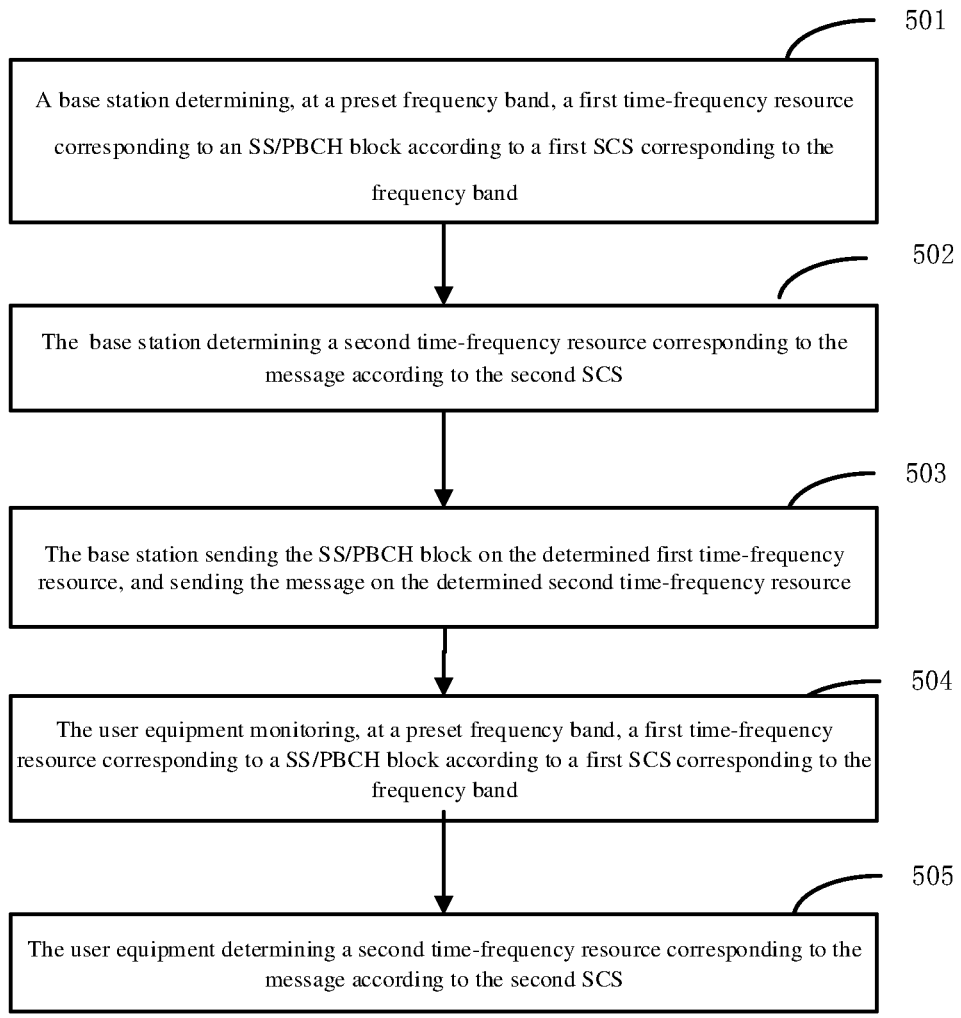
FIG. 5 is a flowchart of a message transmission method according to an exemplary embodiment of the present disclosure.

FIG. 5 is a flowchart of a message transmission method according to an exemplary embodiment of the present disclosure. As illustrated in FIG. 5, the method includes the following actions at steps 501-505.

At step 501, the base station determines, at a preset frequency band, a first time-frequency resource corresponding to a synchronization signal/physical broadcast channel (SS/PBCH) block according to a first subcarrier spacing (SCS) corresponding to the frequency band, the frequency band includes a low frequency band, a first SCS corresponding to the low frequency band includes 15 KHz, 30 KHz or 60 KHz, the SSB includes an indication bit of a second SCS corresponding to a message at the low frequency band, and the indication bit is 1 bit.

At step 502, the base station determines a second time-frequency resource corresponding to the message according to the second SCS.

At step 503, the base station sends the SSB on the determined first time-frequency resource, and sends the message on the determined second time-frequency resource.

At step 504, user equipment, monitors, at the preset frequency band, the first time-frequency resource corresponding to the SSB according to the first SCS corresponding to the frequency band.

At step 505, the user equipment determines the second time-frequency resource corresponding to the message according to the second SCS.

At step 506, the user equipment receives the SSB on the first time-frequency resource, and receives the message on the determined second time-frequency resource.

The above embodiments may be freely combined according to practical needs.

The following are device embodiments of the present disclosure, which may be used to implement the method embodiments of the present disclosure.

Figure 6:
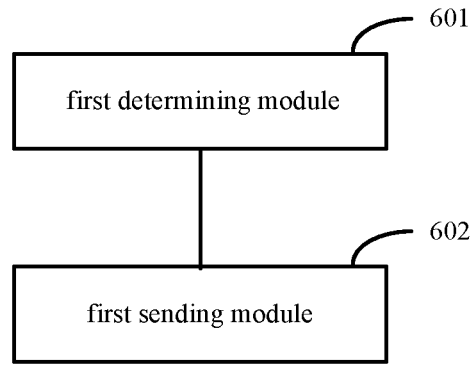
FIG. 6 is a block diagram of a message transmission device according to an exemplary embodiment of the present disclosure.

FIG. 6 is a block diagram of a message transmission device according to an exemplary embodiment of the present disclosure. The device may be implemented as a part or all of an electronic device through software, hardware or a combination of both. The device is applied to the base station side. As illustrated in FIG. 6, the message transmission device includes a first determining module 601 and a first sending module 602.

The first determining module 601 is configured to determine, at a preset frequency band, a first time-frequency resource corresponding to a synchronization signal/physical broadcast channel (SS/PBCH) block according to a first subcarrier spacing (SCS) corresponding to the frequency band, the frequency band includes a low frequency band, a first SCS corresponding to the low frequency band includes 15 KHz, 30 KHz or 60 KHz, the SSB includes an indication bit of a second SCS corresponding to a message at the low frequency band, and the indication bit being 1 bit.

The first sending module 602 is configured to send the SSB on the determined first time-frequency resource.

Figure 7:
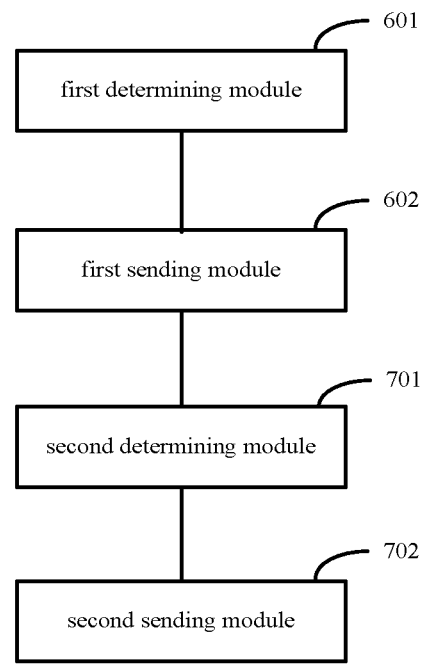
FIG. 7 is a block diagram of a message transmission device according to an exemplary embodiment of the present disclosure.

In an embodiment, as illustrated in FIG. 7, the device further includes a second determining module 701 and a second sending module 702.

The second determining module 701 is configured to determine a second time-frequency resource corresponding to the message according to the second SCS.

The second sending module 702 is configured to send the message on the determined second time-frequency resource.

In an embodiment, when the first SCS includes 30 KHz or 60 KHz, the second SCS includes at least one of 15 KHz, 30 KHz, and 60 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz.

When the first SCS includes 60 KHz, and when time division multiplexing is performed on the first time-frequency resource and the second time-frequency resource, the second SCS includes at least one of 30 KHz and 60 KHz.

When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

Figure 8:
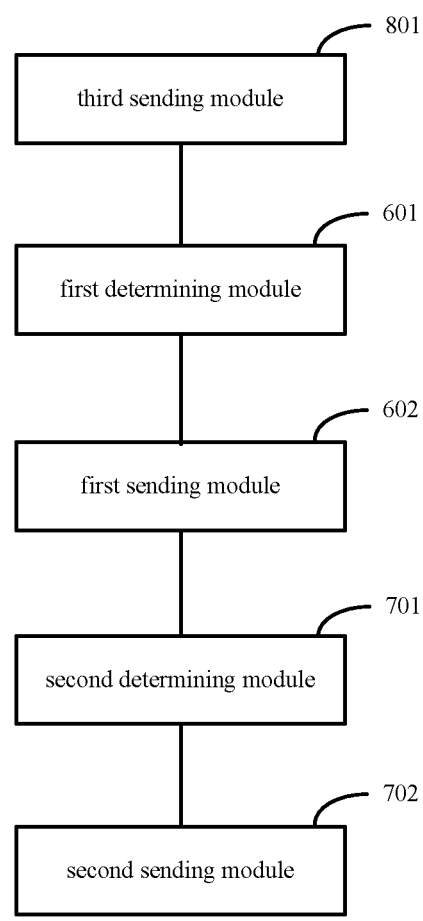
FIG. 8 is a block diagram of a message transmission device according to an exemplary embodiment of the present disclosure.

In an embodiment, as illustrated in FIG. 8, when the first SCS includes 30 KHz and when the time division multiplexing is performed on the first time-frequency resource and the second time-frequency resource, the device further includes: a third sending module 801.

The third sending module 801 is configured to send a master information block (MIB) to user equipment, in which A6 or A7 bit of the MIB is configured to indicate that the second SCS includes at least one of 15 KHz and 30 KHz, or at least one of 30 KHz and 60 KHz.

In an embodiment, the message includes at least one of a system information block, a random response message 2 and a random response message 4.

In an embodiment, a first SCS corresponding to a high sub-band in the low frequency band includes 30 KHz or 60 KHz, and a first SCS corresponding to a low sub-band in the low frequency band includes 15 KHz or 30 KHz.

Figure 9:
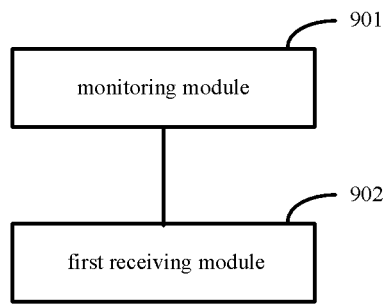
FIG. 9 is a block diagram of a message transmission device according to an exemplary embodiment of the present disclosure.

FIG. 9 is a block diagram of a message transmission device according to an exemplary embodiment of the present disclosure. The device may be implemented as a part or all of an electronic device through software, hardware or a combination of both. The device is applied to the user equipment side. As illustrated in FIG. 9, the device includes a monitoring module 901 and a first receiving module 902.

The monitoring module 901 is configured to monitor, at a preset frequency band, a first time-frequency resource corresponding to an SSB according to a first SCS corresponding to the frequency band. The frequency band includes a low frequency band. A first SCS corresponding to the low frequency band includes 15 KHz, 30 KHz or 60 KHz. The SSB includes an indication bit of a second SCS corresponding to a message on the low frequency band. The indication bit being 1 bit.

The first receiving module 902 is configured to receive the SSB on the first time-frequency resource.

Figure 10:
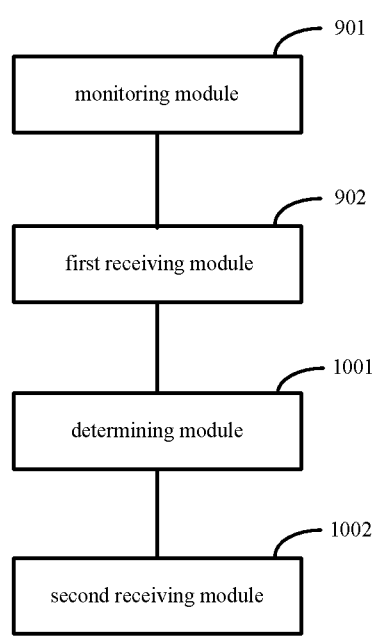
FIG. 10 is a block diagram of a message transmission device according to an exemplary embodiment of the present disclosure.

In an embodiment, as illustrated in FIG. 10, the device further includes: a determining module 1001 and a second receiving module 1002.

The determining module 1001 is configured to determine a second time-frequency resource corresponding to the message according to the second SCS.

The second receiving module 1002 is configured to receive the message on the determined second time-frequency resource.

In an embodiment, when the first SCS includes 30 KHz or 60 KHz, and the second SCS includes at least one of 15 KHz, 30 KHz, and 60 KHz.

In an embodiment, when the first SCS includes 30 KHz or 60 KHz, and when frequency division multiplexing is performed on the first time-frequency resource and the second time-frequency resource, the second SCS includes at least one of 15 KHz and 30 KHz.

When the first SCS includes 60 KHz, and when time division multiplexing is performed on the first time-frequency resource and the second time-frequency resource, the second SCS includes at least one of 30 KHz and 60 KHz.

When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

Figure 11:
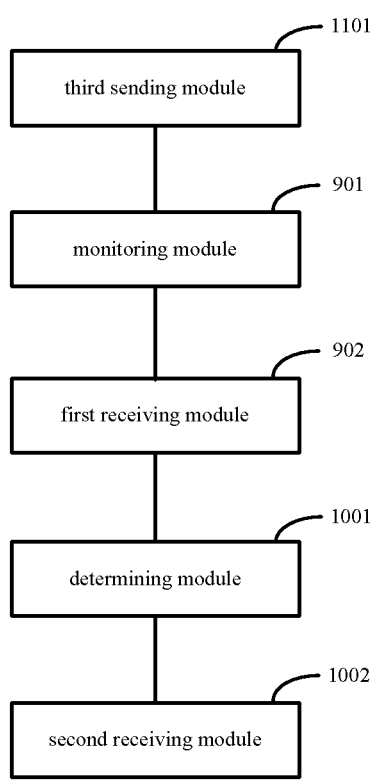
FIG. 11 is a block diagram of a message transmission device according to an exemplary embodiment of the present disclosure.

In an embodiment, as illustrated in FIG. 11, when the first SCS includes 30 KHz and the time division multiplexing is performed on the first time-frequency resource and the second time-frequency resource, the device further includes: a third receiving module 1101.

The third receiving module 1101 is configured to receive a MIB from a base station, in which A6 or A7 bit of the MIB is configured to indicate that the second SCS includes at least one of 15 KHz and 30 KHz, or at least one of 30 KHz and 60 KHz.

In an embodiment, the message includes at least one of a system information block, a random response message 2 and a random response message 4.

In an embodiment, a first SCS corresponding to a high sub-band in the low frequency band includes 30 KHz or 60 KHz, and a first SCS corresponding to a low sub-band in the low frequency band includes 15 KHz or 30 KHz.

For the device in the foregoing embodiments, the specific manner in which each module performs the operation has been described in detail in the method embodiments, which will not be described herein.

Figure 12:
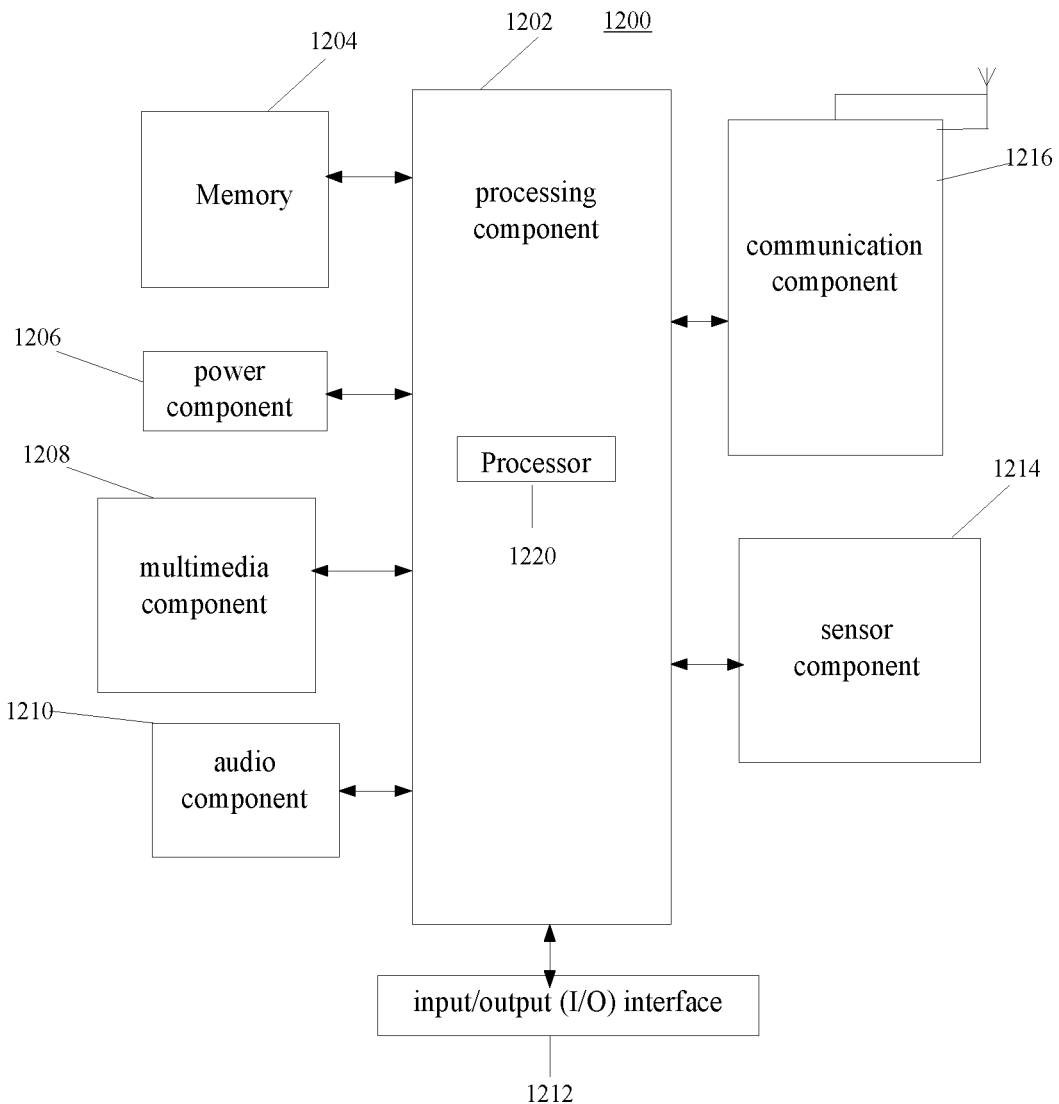
FIG. 12 is a block diagram of a device suitable for message transmission according to an exemplary embodiment of the present disclosure.

FIG. 12 is a block diagram of a device suitable for message transmission according to an exemplary embodiment of the present disclosure. For example, the device 1200 may be a mobile phone, a computer, a digital broadcasting terminal, a message sending-and-receiving device, a game console, a tablet device, a medical device, a fitness device, and a personal digital assistant.

The device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. When the device 1200 is in an operation mode, such as a shooting mode or a video mode, the front camera and/or the rear camera receives external multimedia data. Each front camera and rear camera can be a fixed optical lens system or have focal length and optical zoom capabilities.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 800, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

In exemplary embodiments, a message transmission device is provided. The device includes a processor, and a memory used to store instructions executable by the processor. The processor is configured to: monitor, at a preset frequency band, a first time-frequency resource corresponding to an SSB according to a first SCS corresponding to the frequency band, the frequency band comprising a low frequency band, a first SCS corresponding to the low frequency band comprising 15 KHz, 30 KHz or 60 KHz, the SSB comprising an indication bit of a second SCS corresponding to a message at the low frequency band, and the indication bit being 1 bit; and receive the SSB on the first time-frequency resource send the SSB on the determined first time-frequency resource.

The processor is further configured to determine a second time-frequency resource corresponding to the message according to the second SCS; and receive the message on the determined second time-frequency resource.

When the first SCS includes 30 KHz or 60 KHz, the second SCS includes at least one of 15 KHz, 30 KHz, and 60 KHz.

When the first SCS includes 30 KHz or 60 KHz, and when frequency division multiplexing is performed on the first time-frequency resource and the second time-frequency resource, the second SCS includes at least one of 15 KHz and 30 KHz.

When the first SCS includes 60 KHz, and when time division multiplexing is performed on the first time-frequency resource and the second time-frequency resource, the second SCS includes at least one of 30 KHz and 60 KHz.

When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

The processor may further be configured to: when the first SCS includes 30 KHz and the time division multiplexing is performed on the first time-frequency resource and the second time-frequency resource, receive a MIB from a base station, in which A6 or A7 bit of the MIB is configured to indicate that the second SCS includes at least one of 15 KHz and 30 KHz, or at least one of 30 KHz and 60 KHz.

The message includes at least one of a system information block, a random response message 2 and a random response message 4.

A first SCS corresponding to a high sub-band in the low frequency band includes 30 KHz or 60 KHz, and a first SCS corresponding to a low sub-band in the low frequency band includes 15 KHz or 30 KHz.

A non-transitory computer-readable storage medium is provided. When the instructions in the storage medium are executed by the processor of the device, the device is caused to perform the above message transmission method. The method includes: monitoring, at a preset frequency band, a first time-frequency resource corresponding to an SSB according to a first SCS corresponding to the frequency band, the frequency band including a low frequency band, a first SCS corresponding to the low frequency band including 15 KHz, 30 KHz or 60 KHz, the SSB including an indication bit of a second SCS corresponding to a message on the low frequency band, and the indication bit being 1 bit; and receiving the SSB on the first time-frequency resource.

The instructions in the storage medium may further include: determining a second time-frequency resource corresponding to the message according to the second SCS; and receiving the message on the determined second time-frequency resource.

The instructions in the storage medium further include: when the first SCS includes 30 KHz or 60 KHz, the second SCS includes at least one of 15 KHz, 30 KHz, and 60 KHz.

The instructions in the storage medium further include: when the first SCS includes 30 KHz or 60 KHz, and when frequency division multiplexing is performed on the first time-frequency resource and the second time-frequency resource, the second SCS includes at least one of 15 KHz and 30 KHz; when the first SCS includes 60 KHz, and when time division multiplexing is performed on the first time-frequency resource and the second time-frequency resource, the second SCS includes at least one of 30 KHz and 60 KHz; and when the first SCS includes 30 KHz, and when time division multiplexing is performed on the first time-frequency resource and the second time-frequency resource, the second SCS includes at least one of 15 KHz and 30 KHz, or at least one of 30 KHz and 60 KHz.

The instructions in the storage medium further include: when the first SCS includes 30 KHz and the time division multiplexing is performed on the first time-frequency resource and the second time-frequency resource, the method further includes receiving a MIB from a base station, in which A6 or A7 bit of the MIB is configured to indicate that the second SCS includes at least one of 15 KHz and 30 KHz, or at least one of 30 KHz and 60 KHz.

The instructions in the storage medium further include: the message including at least one of a system information block, a random response message 2 and a random response message 4.

The instructions in the storage medium further include: a first SCS corresponding to a high sub-band in the low frequency band includes 30 KHz or 60 KHz, and a first SCS corresponding to a low sub-band in the low frequency band includes 15 KHz or 30 KHz.

Figure 13:
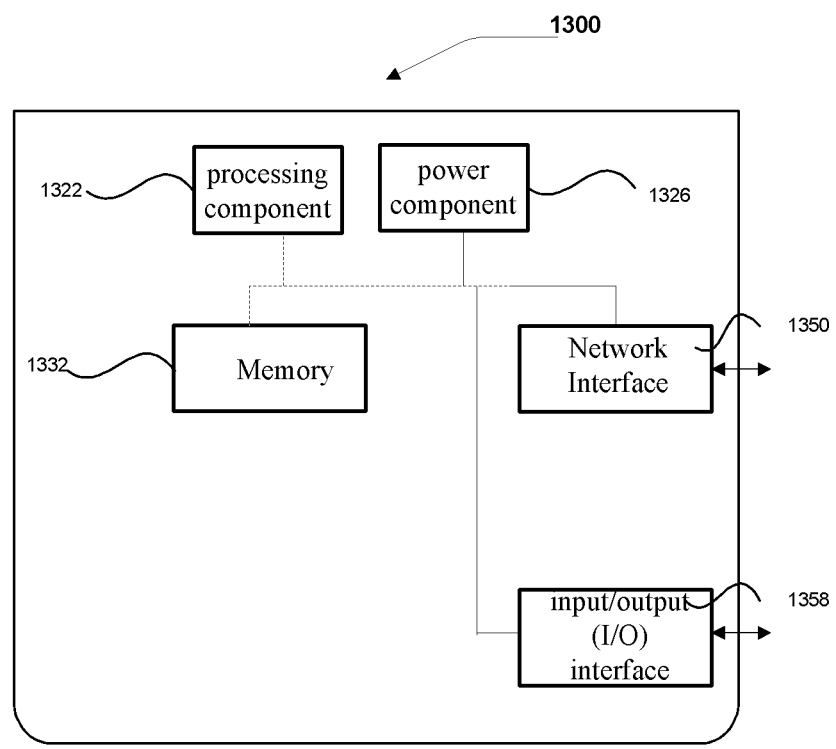
FIG. 13 is a block diagram of a device suitable for message transmission according to an exemplary embodiment of the present disclosure.

FIG. 13 is a block diagram of a device 1300 for synchronous data message transmission according to an exemplary embodiment of the present disclosure. For example, the device 1300 may be provided as a computer. As illustrated in FIG. 13, the device 1300 includes a processing component 1322, which further includes one or more processors, and a memory resource represented by a memory 1332 for storing instructions executable by the processing component 1322, such as application programs. The application programs stored in the memory 1332 may include one or more modules each corresponding to a set of instructions. In addition, the processing component 1322 is configured to execute instructions to perform the aforementioned method for message transmission.

The device 1300 may also include a power component 1326 configured to perform power management of the device 1300, a wired or wireless network interface 1350 configured to connect the device 1300 to a network, and an input output (I/O) interface 1358. The device 1300 operates based on an operating system stored in the memory 1332, such as Windows Server™, Mac OS X™, Unix™, Linux™, FreeBSD™ or the like.

In an example embodiment, a message transmission device is provided. The device includes: a processor and a memory configured to store instructions executable by the processor. The processor is configured to: determine, at a preset frequency band, a first time-frequency resource corresponding to a synchronization signal/physical broadcast channel (SS/PBCH) block according to a first subcarrier spacing (SCS) corresponding to the frequency band, the frequency band including a low frequency band, a first SCS corresponding to the low frequency band including 15 KHz, 30 KHz or 60 KHz, the SSB including an indication bit of a second SCS corresponding to a message at the low frequency band, and the indication bit being 1 bit; and send the SSB on the determined first time-frequency resource.

The processor is further configured to: determine a second time-frequency resource corresponding to the message according to the second SCS; and send the message on the determined second time-frequency resource.

When the first SCS includes 30 KHz or 60 KHz, the second SCS includes at least one of 15 KHz, 30 KHz, and 60 KHz.

When the first SCS includes 30 KHz or 60 KHz, and when frequency division multiplexing is performed on the first time-frequency resource and the second time-frequency resource, the second SCS includes at least one of 15 KHz and 30 KHz.

When the first SCS includes 60 KHz, and when time division multiplexing is performed on the first time-frequency resource and the second time-frequency resource, the second SCS includes at least one of 30 KHz and 60 KHz.

When the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

When the first SCS includes 30 KHz and the time division multiplexing is performed on the first time-frequency resource and the second time-frequency resource, the processor is further configured to: send a MIB from a base station, in which A6 or A7 bit of the MIB is configured to indicate that the second SCS includes at least one of 15 KHz and 30 KHz, or at least one of 30 KHz and 60 KHz.

The message includes at least one of a system information block, a random response message 2 and a random response message 4.

A first SCS corresponding to a high sub-band in the low frequency band includes 30 KHz or 60 KHz, and a first SCS corresponding to a low sub-band in the low frequency band includes 15 KHz or 30 KHz.

A non-transitory computer-readable storage medium is provided. When instructions in the storage medium are executed by a processor of a device, the device is caused to perform the above message transmission method.

The method includes: determining, at a preset frequency band, a first time-frequency resource corresponding to an SSB according to a first SCS corresponding to the frequency band, the frequency band including a low frequency band, a first SCS corresponding to the low frequency band including 15 KHz, 30 KHz or 60 KHz, the SSB including an indication bit of a second SCS corresponding to a message on the low frequency band, and the indication bit being 1 bit; and sending the SSB on the first time-frequency resource.

The method further includes: determining a second time-frequency resource corresponding to the message according to the second SCS; and sending the message on the determined second time-frequency resource.

The instructions in the storage medium further include: when the first SCS includes 30 KHz or 60 KHz, the second SCS includes at least one of 15 KHz, 30 KHz, and 60 KHz.

The instructions in the storage medium further include: when the first SCS includes 30 KHz or 60 KHz, and when frequency division multiplexing is performed on the first time-frequency resource and the second time-frequency resource, the second SCS includes at least one of 15 KHz and 30 KHz; when the first SCS includes 60 KHz, and when time division multiplexing is performed on the first time-frequency resource and the second time-frequency resource, the second SCS includes at least one of 30 KHz and 60 KHz; and when the first SCS includes 30 KHz, and when the time division multiplexing is performed on the first time-frequency resource and the second time-frequency resource, the second SCS includes at least one of 15 KHz and 30 KHz, or at least one of 30 KHz and 60 KHz.

The instructions in the storage medium further include: when the first SCS includes 30 KHz and the time division multiplexing is performed on the first time-frequency resource and the second time-frequency resource, the method further includes receiving a MIB from a base station, in which A6 or A7 bit of the MIB is configured to indicate that the second SCS includes at least one of 15 KHz and 30 KHz, or at least one of 30 KHz and 60 KHz.

The instructions in the storage medium further include: the message including at least one of a system information block, a random response message 2 and a random response message 4.

The instructions in the storage medium further include: a first SCS corresponding to a high sub-band in the low frequency band includes 30 KHz or 60 KHz, and a first SCS corresponding to a low sub-band in the low frequency band includes 15 KHz or 30 KHz.

Those skilled in the art easily think of other embodiments of the present disclosure after considering the description and practicing the present disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A message transmission method, applied to a base station, the method comprising:
    determining, at a preset frequency band, a first time-frequency resource corresponding to a synchronization signal/physical broadcast channel block (SSB) according to a first subcarrier spacing (SCS) corresponding to the frequency band, the frequency band comprising a low frequency band, the first SCS corresponding to the low frequency band comprising 15 KHz, 30 KHz or 60 KHz, the SSB comprising an indication bit of a second SCS corresponding to a message at the low frequency band, and the indication bit being 1 bit; and
    sending the SSB on the determined first time-frequency resource.

2. The method according to claim 1, further comprising:
    determining a second time-frequency resource corresponding to the message according to the second SCS; and
    sending the message on the determined second time-frequency resource.

3. The method according to claim 1, wherein when the first SCS comprises 30 KHz or 60 KHz, and the second SCS comprises at least one of 15 KHz, 30 KHz, and 60 KHz.

4. The method according to claim 3, wherein,
    when the first SCS comprises 30 KHz or 60 KHz, and when frequency division multiplexing is performed on the first time-frequency resource and the second time-frequency resource, the second SCS comprises at least one of 15 KHz and 30 KHz;
    when the first SCS comprises 60 KHz, and when time division multiplexing is performed on the first time-frequency resource and the second time-frequency resource, the second SCS comprises at least one of 30 KHz and 60 KHz; and
    when the first SCS comprises 30 KHz, and when the time division multiplexing is performed on the first time-frequency resource and the second time-frequency resource, the second SCS comprises at least one of 15 KHz and 30 KHz, or at least one of 30 KHz and 60 KHz.

5. The method according to claim 4, wherein when the first SCS comprises 30 KHz and the time division multiplexing is performed on the first time-frequency resource and the second time-frequency resource, the method further comprises:
    sending a master information block (MIB) to user equipment, wherein A6 or A7 bit of the MIB is configured to indicate that the second SCS comprises at least one of 15 KHz and 30 KHz, or at least one of 30 KHz and 60 KHz.

6. The method according to claim 1, wherein the message comprises at least one of a system information block, a random response message 2 and a random response message 4.

7. The method according to claim 1, wherein a first SCS corresponding to a high sub-band in the low frequency band comprises 30 KHz or 60 KHz, and a first SCS corresponding to a low sub-band in the low frequency band comprises 15 KHz or 30 KHz.

8. A message transmission device, comprising:
    a processor; and
    a memory configured to store instructions executable by the processor;
    wherein the processor is configured to perform the method according to claim 1.

9. A message transmission method, applied to user equipment, the method comprising:
    monitoring, at a preset frequency band, a first time-frequency resource corresponding to a synchronization signal/physical broadcast channel block (SSB) according to a first subcarrier spacing (SCS) corresponding to the frequency band, the frequency band comprising a low frequency band, the first SCS corresponding to the low frequency band comprising 15 KHz, 30 KHz or 60 KHz, the SSB comprising an indication bit of a second SCS corresponding to a message at the low frequency band, and the indication bit being 1 bit; and
    receiving the SSB on the first time-frequency resource.

10. The method according to claim 9, further comprising:
    determining a second time-frequency resource corresponding to the message according to the second SCS; and
    receiving the message on the determined second time-frequency resource.

11. The method according to claim 9, wherein when the first SCS comprises 30 KHz or 60 KHz, the second SCS comprises at least one of 15 KHz, 30 KHz, and 60 KHz.

12. The method according to claim 11, wherein, when the first SCS comprises 30 KHz or 60 KHz, and when frequency division multiplexing is performed on the first time-frequency resource and the second time-frequency resource, the second SCS comprises at least one of 15 KHz and 30 KHz;
    when the first SCS comprises 60 KHz, and when time division multiplexing is performed on the first time-frequency resource and the second time-frequency resource, the second SCS comprises at least one of 30 KHz and 60 KHz; and
    when the first SCS comprises 30 KHz, and when the time division multiplexing is performed on the first time-frequency resource and the second time-frequency resource, the second SCS comprises at least one of 15 KHz and 30 KHz, or at least one of 30 KHz and 60 KHz.

13. The method according to claim 12, wherein when the first SCS comprises 30 KHz and the time division multiplexing is performed on the first time-frequency resource and the second time-frequency resource, the method further comprises:
    receiving a master information block (MIB) from a base station, wherein A6 or A7 bit of the MIB is configured to indicate that the second SCS comprises at least one of 15 KHz and 30 KHz, or at least one of 30 KHz and 60 KHz.

14. The method according to claim 9, wherein the message comprises at least one of a system information block, a random response message 2 and a random response message 4.

15. The method according to claim 9, wherein a first SCS corresponding to a high sub-band in the low frequency band comprises 30 KHz or 60 KHz, and a first SCS corresponding to a low sub-band in the low frequency band comprises 15 KHz or 30 KHz.

16. A message transmission device, comprising:
a processor; and
a memory storing executable instructions of the processor;
wherein the processor is configured to:
monitor, at a preset frequency band, a first time-frequency resource corresponding to a synchronization signal/physical broadcast channel block (SSB) according to a first subcarrier spacing (SCS) corresponding to the frequency band, the frequency band comprising a low frequency band, the first SCS corresponding to the low frequency band comprising 15 KHz, 30 KHz or 60 KHz, the SSB comprising an indication bit of a second SCS corresponding to a message at the low frequency band, and the indication bit being 1 bit; and
receive the SSB on the first time-frequency resource.

* * * * *